United States Patent
El-Damhougy

(10) Patent No.: US 7,542,436 B2
(45) Date of Patent: Jun. 2, 2009

(54) TACTICAL COGNITIVE-BASED SIMULATION METHODS AND SYSTEMS FOR COMMUNICATION FAILURE MANAGEMENT IN AD-HOC WIRELESS NETWORKS

(75) Inventor: Hesham El-Damhougy, Tustin, CA (US)

(73) Assignee: The Boeing Company, Chicago, IL (US)

( * ) Notice: Subject to any disclaimer, the term of this patent is extended or adjusted under 35 U.S.C. 154(b) by 423 days.

(21) Appl. No.: 11/187,452

(22) Filed: Jul. 22, 2005

(65) Prior Publication Data

US 2007/0021954 A1    Jan. 25, 2007

(51) Int. Cl.
*H04B 7/00* (2006.01)

(52) U.S. Cl. .................. 370/310; 370/252; 370/329; 370/254; 713/13; 713/15

(58) Field of Classification Search .................. 713/13, 713/17; 370/254, 252, 329, 310
See application file for complete search history.

(56) References Cited

U.S. PATENT DOCUMENTS

| | | | |
|---|---|---|---|
| 6,304,556 B1 * | 10/2001 | Haas | 370/254 |
| 6,362,783 B1 | 3/2002 | Sugiura et al. | |
| 6,535,498 B1 * | 3/2003 | Larsson et al. | 370/338 |
| 6,625,462 B1 | 9/2003 | Arnold | |
| 6,640,253 B2 * | 10/2003 | Schaefer | 709/248 |
| 6,718,394 B2 * | 4/2004 | Cain | 709/242 |
| 6,766,309 B1 * | 7/2004 | Cheng et al. | 706/3 |
| 6,836,756 B1 * | 12/2004 | Gruber | 703/19 |
| 6,917,985 B2 * | 7/2005 | Madruga et al. | 709/238 |
| 6,922,395 B1 * | 7/2005 | Elliott et al. | 370/241 |
| 6,965,851 B2 * | 11/2005 | Tillotson | 703/13 |
| 7,042,867 B2 | 5/2006 | Whitehill et al. | |
| 7,177,653 B2 | 2/2007 | McAvoy | |
| 7,181,214 B1 | 2/2007 | White | |
| 2004/0088148 A1 * | 5/2004 | Szymanski et al. | 703/13 |
| 2004/0219909 A1 * | 11/2004 | Kennedy et al. | 455/422.1 |
| 2005/0117530 A1 | 6/2005 | Abraham et al. | |
| 2005/0195761 A1 | 9/2005 | Alicherry et al. | |
| 2006/0039300 A1 | 2/2006 | Ogier et al. | |
| 2006/0104219 A1 * | 5/2006 | Kennedy | 370/254 |
| 2007/0097873 A1 | 5/2007 | Ma et al. | |
| 2007/0299794 A1 | 12/2007 | El-Damhougy | |

OTHER PUBLICATIONS

Kumar et al., "Performance Comparison of Multicast Protocol for Physically Hierarchical Ad Hoc Networks using Neural Concepts", ICSP'04 Proceedings, 2004, pp. 1582-1584.

Gelenbe et al., "Linlk Quality-Aware Routing", PE-WASUN '04, ACM, 2004, pp. 87-90.

* cited by examiner

*Primary Examiner*—Charles N Appiah
*Assistant Examiner*—Kwasi Karikari
(74) *Attorney, Agent, or Firm*—Yee & Associates, P.C.; Baldwin D. Quan

(57) ABSTRACT

Techniques are provided for simulating battlefield scenarios in an ad-hoc communications network comprising a plurality of nodes and a plurality of links between the nodes.

14 Claims, 4 Drawing Sheets

TACTICAL COGNITIVE-BASED SIMULATION METHODS AND SYSTEMS FOR COMMUNICATION FAILURE MANAGEMENT IN AD-HOC WIRELESS NETWORKS

TECHNICAL FIELD

The present invention generally relates to tactical communications and, more particularly, to simulation techniques for ad-hoc mobile wireless networks.

BACKGROUND

Tactical radio communications rely heavily on ad-hoc mobile radio networks and systems. Emerging tactical battlefield networks typically include a collection of autonomous host nodes or terminals that are mobile. These nodes move into and out of radio communication range with each other, and generally can not rely on a pre-defined fixed infrastructure within their environment. The nodes in an ad-hoc communications network may move, be destroyed, or new nodes may join the network. In other words, the network environment is mobile, wireless, dynamically changing, and is "infrastructure-less."

Wireless Ad-hoc Networks

In a wireless ad-hoc network a group of autonomous nodes or terminals communicate with each other by forming a multi-hop radio network and maintaining connectivity in a decentralized manner. The nodes represent radio communication devices which may be with a person (such as a warfighter), a ground or an air vehicles platforms, an Unmanned Air Vehicle (UAV), or an Unmanned Ground Vehicles (UGV), etc. The network can be represented by a graph, where the graph vertices are the network nodes and two vertices are connected by an edge if the corresponding nodes can be reached (or communicate) by a radio link. In other words the nodes can be depicted as a set of points. Connections between these points can be shown as lines with each line representing a radio link over which one node can communicate with another node. Two radio nodes are said to be communicating if the link quality is above a predefined threshold, such as, if the signal-to-noise ratio is above a predefined threshold.

The mobile nodes must be able to communicate with each other over a wireless media without any infra-structured network component support such as fixed radio relay base stations. Each mobile node can typically communicate with its neighboring mobile nodes which are a single radio hop away. Each mobile node operates not only as a host but also as a router, forwarding packets of information to other mobile nodes in the network that may not be within direct wireless transmission range of each other. Each node participates in an ad-hoc routing protocol that allows it to discover "multi-hop" paths through the network to any other node. Control of the network is distributed among the nodes.

The network topology is "ad-hoc" in that it dynamically changes over time because the connectivity among the nodes may vary with time. For example, because the nodes are mobile, the network topology may change rapidly and unpredictably over time due to node departures, new node arrivals, and the mobility of the nodes. Nodes can fail, for example, if they are destroyed or due to hard or soft failures which occur in the battlefield. Moreover, since the nodes communicate over wireless links, the nodes have to contend with the effects of radio communication, such as noise, fading, and interference. Factors such as variable wireless link quality, propagation path loss, fading, multi-user interference, power expended, and topological changes may become relevant issues. Connections between nodes may also be broken or established due to, for example, distance factors, variations in signal strength, weather, mountains, buildings, loss of node, etc. Thus, changes in propagation conditions and the environment, as well as the unpredictability of node movements and sporadic node failures, can contribute to the dynamic nature of an ad-hoc network. These problems are even further complicated in a military environment where the preservation of security, latency, reliability, intentional jamming, and recovery from failure are significant concerns.

Accordingly, one of the most important features of any an ad-hoc mobile network, is the ability to adapt well to link changes, namely changes in the interconnectivity between mobile nodes.

Joint Tactical Radio System (JTRS)

The Joint Tactical Radio System (JTRS) is a Department of Defense (DoD) initiative designed to provide a flexible new approach to meet diverse warfighter communications needs through software-programmable tactical radio technology or "software defined radios (SDRs)." It is desirable to provide SDRs which can provide a warfighter with voice, data and video communications across a battlespace. Beyond the battlefield, JTRS holds great potential for initiatives such as homeland security, federal, state and local law enforcement, search and rescue, commercial aviation and international commercial applications. The JTRS implements the concept of relay and translation nodes (land, sea, air and space based) to help ensure that tactical users can access required information no matter where it resides.

There are several issues facing dynamic ad-hoc networks. For example, links between nodes are the frequently broken as nodes move or are destroyed. In addition, nodes can randomly fail due to enemy or unintentional attacks.

Thus, a challenge in ad-hoc networks is to maintain network-wide connectivity. In this context a network is "connected" if there is a communication path, either node-to-node or multiple-node-hopping, which can allow any two nodes in the network to communicate with one another. As noted above, as nodes move the links between the nodes can be broken and the network can partition into isolated sub-networks. A break in the network can create a situation where the node cannot communicate with another node (absolutely no paths). In this case, the network is said to be "partitioned."

In ad-hoc radio networks, there is a need for techniques which can assist with battle space communication planning and fault management sub-systems to help ensure communication reliability and connectivity of the ad-hoc network. It would be desirable to provide techniques for use during the planning stage of a mission to predict and detect link failures, determine and identify network partitions, and assess the reliability of the network. It would also be desirable to provide techniques for restoring connectivity to a partitioned ad-hoc network so that each node can communicate with other nodes. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will be described in conjunction with the following drawing figures, wherein like numerals denote like elements.

DETAILED DESCRIPTION

Figure 1:
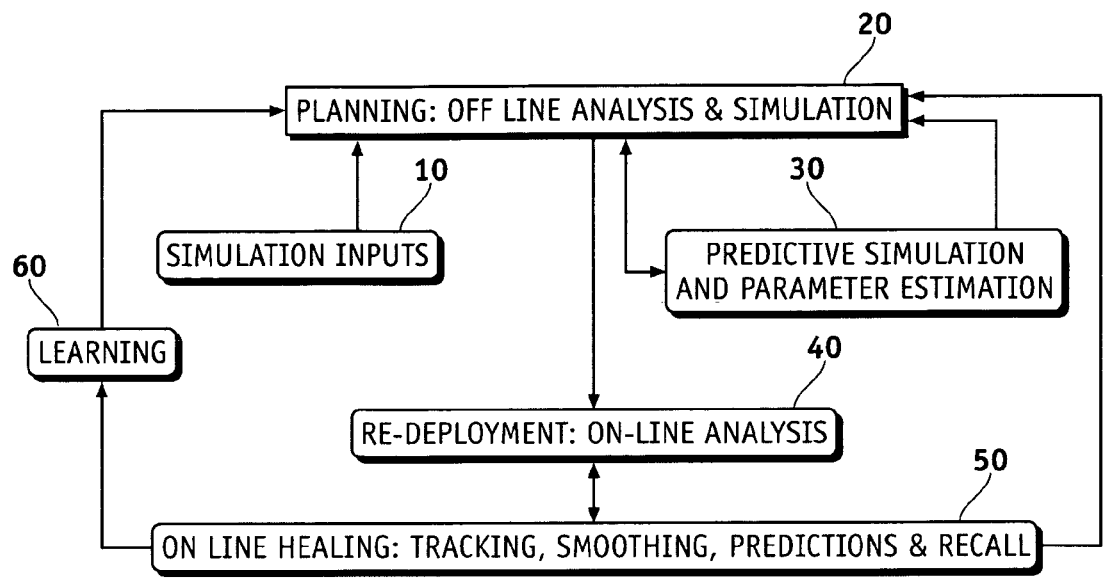
FIG. 1 is a block diagram of an adaptive neural-based battlefield planning and maintenance system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Overview

Embodiments of the present invention can provide an intelligent cognitive-based system which assists in the non-real time communication planning phase of a given tactical mission by providing techniques for an off-line event driven simulation during the initial planning phase of a tactical mission. Embodiments of the present invention provide methods and systems for an off-line event-driven simulation for failure management in an ad-hoc network. This system can predict and detect link failures, network partitions and separation, and reliability due to propagation environments by taking into account individual link life failure under predicted RF propagation conditions. Once faults have been detected and identified, techniques are provided which can allow for recovery from these failures by restoring connectivity between nodes in the ad-hoc network. These schemes are applicable to tactical communication networks and can operate at the Network Management and/or network radio nodes.

Techniques are provided for simulating battlefield scenarios in an ad-hoc network comprising a plurality of nodes and a plurality of links between the nodes. According to these techniques, simulation inputs can be used to create a time-based sequence of events. The simulation inputs may comprise, for example, scenario parameters, radio propagation models, a terrain database, and/or mission maps. The time-based sequence of events may comprise, for example, a discrete time sequence of predicted events and random events which change the ad-hoc communications network. The discrete time sequence of predicted events can include, for example, node movements which change the ad-hoc communications network, while random events may comprise at least one of weather changes, terrain changes, or loss of nodes which change the ad-hoc communications network. The ad-hoc network adapts in response to the time-based sequence of events such that each of the nodes maintain a link to at least one of the other nodes which allows each of the nodes to communicate with each of the other nodes.

In one implementation, the ad-hoc network adapts in response to the time-based sequence of events by determining partitions and de-partitions (or reconnections which reconnect the node) in the ad-hoc network based on the time-based sequence of events, assessing reliability of the ad-hoc network based on the time-based sequence of events, and determining corrections needed to restore the ad-hoc network to a fully communicating ad-hoc network based on the time-based sequence of events. A partition comprises a broken communication path between two nodes which prevents at least one of the nodes from communicating with other nodes. De-partitions can be changes in partition topology which occur when some nodes re-connect after being in a disconnected state.

Adaptive Neural-Based Battlefield Planning and Maintenance System

FIG. 1 is a block diagram of an adaptive neural-based battlefield planning and maintenance system.

The system comprises a planning module 20, a predictive simulation and parameter estimation module 30, a re-deployment module 40, an on-line healing module 50 and a learning module 60. This description relates to off-line event-driven simulation techniques for failure management in an ad-hoc communications network. The re-deployment module 40, on-line healing module 50 and learning module 60 relate to the use of these techniques in a system for on-line, real time adaptation and fine tuning of an ad-hoc network.

The planning module 20 is used for off-line (non-real time) analysis and simulation. As will be described in detail below, the planning module 20 employs: (i) techniques for detecting and predicting network partitions, de-partitions and reliability/survivability in a generic radio propagation environment and (ii) techniques for optimal placement and trajectory formation of healing or "mobile backbone" nodes which can reconnect the entire ad-hoc network. The planning module 20 receives simulation inputs 10 which affect the ad-hoc network and uses the simulation inputs 10 to provide an off-line, event driven simulation during the initial planning phase of a tactical mission. These simulations can be used for the initial planning of a tactical mission to help ensure and improve communication reliability in the battlefield. As will be described in greater detail below, these simulation inputs 10 are based on a discrete time sequence of predicted events, for example, due to node movements and random events, for example, due to weather changes, terrain changes, loss of nodes, etc.

Among other things, the simulations can be used to predict and identify the partitions in an ad-hoc network and then heal the network based on the predictions. As such techniques can be provided for predicting and detecting network failures, and for taking healing and corrective action to fix network partitions. These simulations can use mobile and partitioning prediction algorithms and link life estimation algorithms.

The predictive simulation and parameter estimation module 30 uses past and current experiences/information about the system/network such as node positions, velocities and radio link qualities between nodes to gain insight into and predict future events. These include network failure events such as network partitions, number of partitions and how long those partitions last before the network reconnects again without adding external healing nodes or new partitions occur. This process will aid in the planning phase, for example, to forecast the required number of healing nodes such as UAVs or UGVs to perform missions and what if scenarios within those possible missions, etc. The learning module 60 uses on line network measurements to learn about the environment and then adapt/adjust system models parameters including propagation models. The measured values together with these parameters are fed to the simulation modules 20 for further refinements. The measurements include node-to-node link qualities such as $E_b/N_0$ or signal to noise ratios, link bit errore rates (BERs), and distances between nodes. In the off-line simulation system this is emulated/performed by adding random or stochastic error components to the system models that drive the simulation and then using current measurements during the simulation run to adapt and adjust system models.

Figure 2:
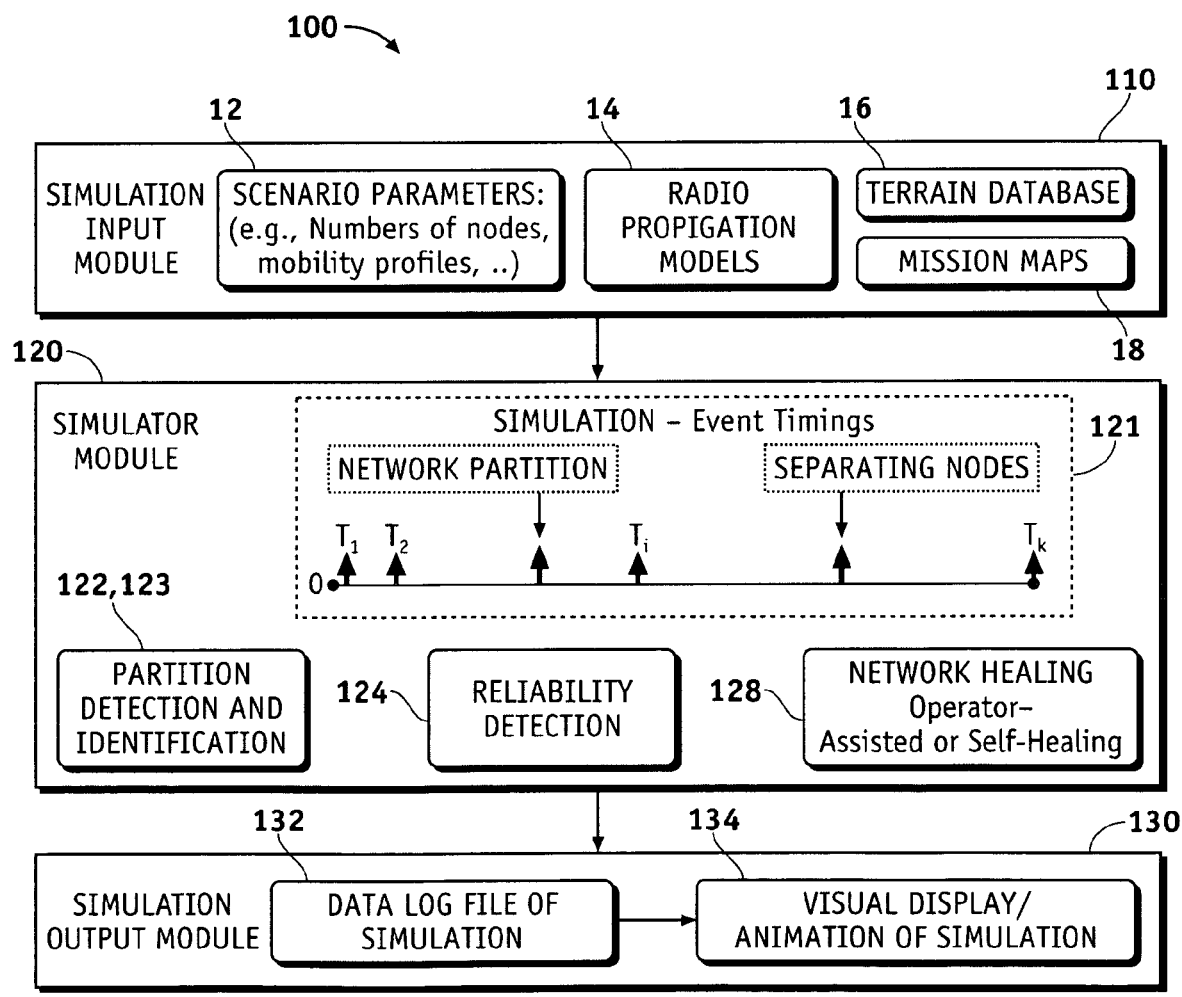
FIG. 2 is a block diagram of a simulator system for off-line, event-driven simulations in an ad-hoc communications network according to an embodiment.

FIG. 2 is a block diagram of a simulator system 100 for off-line, event-driven simulations in an ad-hoc communications network according to an embodiment. This system 100 can be used to implement the planning module 20 of FIG. 1.

The system 100 comprises simulation input module 110, a simulator module 120 and simulation output module 130. The simulation input module 110 provides "input simulation parameters" which can be fed into the simulator module 120 and used by the simulator module 120 to predict and create a time-based sequence of events 121, such as nodes moving, nodes being destroyed, connections or links breaking and forming, etc. Responsive to the time-based sequence of events 121 the simulator module 120 can generate a data log file 132 of the simulation results which is provided to the simulation output module 130.

Simulation Inputs

The simulation input module 110 can provide information which may comprise, for example, scenario parameters 12, radio propagation models 14, terrain database 16, and mission maps 18. The scenario parameters 12 can include information such as the number of nodes and associated mobility profiles or patterns of those nodes (e.g., initial node locations, future locations, speeds, velocities, etc.). The scenario parameters 12 can also include information regarding node failure stochastic profiles, for instance, the probability of a node being turned off, lost or destroyed, mobility or trajectory model of each node. The radio propagation loss models 14 can be either deterministic or stochastic. For example, the radio propagation loss models 14 can be a single valued function denoted by $d(\underline{x},\underline{y})$ (or $L(\underline{x},\underline{y})$) of two variables $\underline{x},\underline{y}$ where x,y are two arbitrary node positions. In general d $(\underline{x},\underline{y})$ is a random variable or stochastic process. The terrain database 16 and the mission maps 18 can include environmental information, information about inaccessible, vulnerable or hostile regions, places where nodes cannot move to such as water for land mobile nodes, etc.

Simulator Module

The simulator module 120 comprises partition detection and identification modules 122/123, a reliability detection module 124 and a network healing module 128. The simulator module 120 receives the information from the simulation input module 110 and uses it to create the time series of simulation events 121. Generally, the time series of simulation events 121 can include link failure events and node events. The link failure events and node events may comprise a time series of deterministic (planned), random, and predicted link failure events as well as random and predicted node events. Examples of random link failure events are due to changes in propagation conditions such as terrain changes, weather changes, etc. Examples of predicted link failure events, for example, due to mobility of nodes which could result in partitions in the network, changes in reliability of the network, etc. Examples of node events would include node additions or deletions. Based on the time series of simulation events 121, as the simulation is executed, the simulator module 120 and its modules can generate a data log file 132 for use by the simulation output module 130.

Simulator Modules

To find and characterize disconnects in the network, modules are provided for partition detection 122, partition identification 123 and reliability detection and identification 124. The time series of simulation events 121 can be used by the partition detection module 122, partition identification module 123 and reliability detection module 124.

Partition Detection and Identification Modules

The partition detection module 122 and the partition identification module 123 can time series of simulation events 121 to detect and predict network partitions or disconnects in the network.

Partition detection module 122 detects and predicts network partitions in a generic radio propagation environment to determine whether a network is "connected." The partition detection module 122 can detect and predict network partitions based on at least two different partition scenarios. The first partition scenario relates to cases where an unlimited number of hops is possible such that the maximum allowable number of hops is greater than or equal to a graph diameter. The second partition scenario relates to cases where the number of hops is limited such that the maximum allowable number of hops is less than the graph diameter.

If the network is partitioned, the partition identification module 123 can be used to identify which nodes belong to a particular partition. In one embodiment, the partition identification module 123 can utilize neuro-based partition identification techniques.

Reliability Detection Module

The reliability detection module 124 uses the time series of simulation events 121 to detect or determine and assess reliability of the network in a generic radio propagation environment. To assess the reliability of the network the reliability detection module 124 can identify redundant communication paths and communication paths that are at risk. The reliability detection module 124 can include a partition predictor sub-module (not shown) which utilizes techniques for mobility prediction, partition prediction and link life estimation between any two arbitrary radio nodes in an ad-hoc mobile radio network. This helps to assess the reliability of the network by predicting network partitions and identifying potential points of failure.

Network Healing Module

The network healing module 128 can use the time series of simulation events 121 to generate Dynamic Mobile Trajectory (DMT) formation schemes. These DMT formation schemes can be used to generate an optimal number of healing or "backbone" nodes and the optimal placement of those healing nodes to reconnect and restore or "heal" a partitioned ad-hoc network. This helps ensure network wide radio connectivity and reliability.

In one embodiment, the network healing module 128 can reconnect the entire ad-hoc communications network by adding, subtracting or relocating nodes to help ensure network wide radio connectivity and reliability. The output of the network healing module can include any combination of adding, deleting, or moving nodes. External nodes can be added, for example, by positioning external nodes such as Unmanned Air Vehicles (UAVs) or Unmanned Ground Vehicles (UGVs) in appropriate locations. In addition, at least some of the existing nodes can be repositioned to re-establish network wide connectivity. This restores the ad-hoc communications network by moving existing nodes into a different configuration. As such, these techniques can be used to restore a partitioned network or improve the reliability of the partitioned ad-hoc communications network.

Simulation Outputs

The simulator module 120 outputs a data log file 132 which can be used to drive a visual display 134 of the simulation. The simulation output module 130 can be provided as a function of time and comprise the data log of the simulation 132. The data log of the simulation 132 includes network partition patterns as a function of time or time series with partition identifications showing which nodes belong to a particular partition. The data log of the simulation 132 also includes a dynamic time series of optimum healing node positions which can reconnect the partitioned ad-hoc network to ensure full connectivity between nodes. The data log of the simulation 132 also includes predictions as to predicted partitions, predicted healing characteristics, and other statistics. The data log of the simulation 132 can be displayed on the visual display 134. The visual display 134 can, among other things, animate the simulation.

Figure 3:
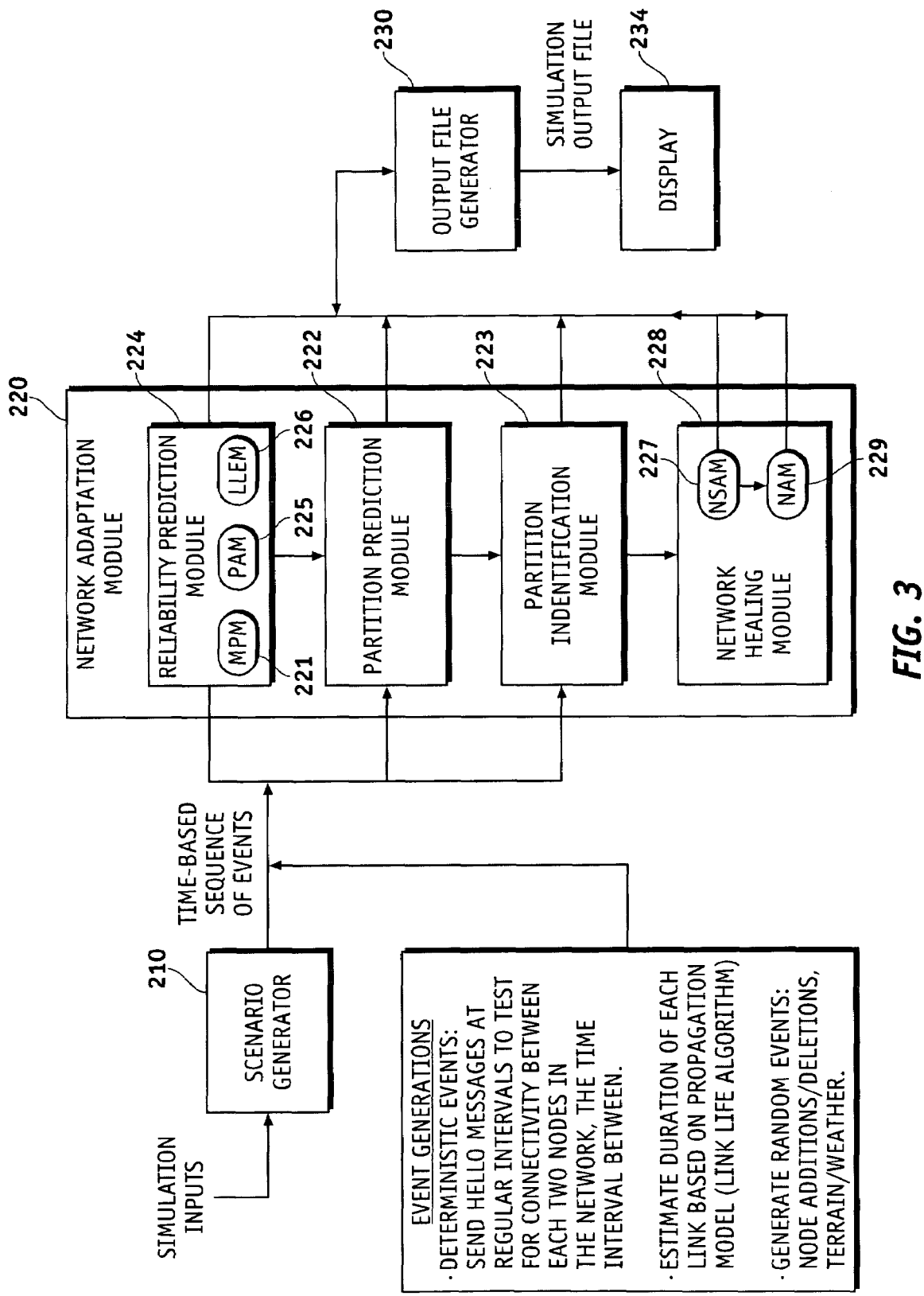
FIG. 3 is a block diagram of another simulator system for off-line, event-driven simulations in an ad-hoc communications network according to another embodiment.

FIG. 3 is a block diagram of an adaptive neural-based simulator system for off-line, event-driven simulations in an ad-hoc communications network according to another embodiment. This system can be used, for instance, to simulate battlefield scenarios in an ad-hoc communications network comprising a plurality of nodes and a plurality of links between the nodes.

The system comprises a scenario generator 210, a network adaptation module 220, an output file generator module 230 and a display module 234.

The scenario generator 210 receives simulation inputs and uses the simulation inputs to create a time-based sequence of events. As noted above, the simulation inputs may comprise, for example, scenario parameters, radio propagation models, a terrain database, and mission maps. As noted above, the time-based sequence of events may comprise a discrete time sequence of predicted events and random events which change the ad-hoc communications network. For example, the discrete time sequence of predicted events may comprise events such as node movements which change the ad-hoc communications network. The random events may comprise, for example, at least one of weather changes, terrain changes, or loss of nodes which change the ad-hoc communications network.

The network adaptation module 220 generates output files which include information regarding partitions predicted in the network, information specifying which nodes correspond to a particular partition, information regarding redundant communication paths and at risk communication paths and information about corrections needed to restore the network to a fully communicating network. These output files can also include information which can be used adapt the ad-hoc network in response to the time-based sequence of events such that each of the nodes maintain a link which allows that node to communicate with each of the other nodes.

The network adaptation module 220 can include, for example, a reliability prediction module 224, a partition prediction module 222, a partition identification module 223, and a network healing module 228.

The reliability prediction module 224 can receive the time-based sequence of events, assess the reliability of the network, and generate a portion of the simulation output file which is passed to the output file generator module 230.

The reliability prediction module 224 can include, for example, a mobility predictor module (MPM) 221, a path analysis module (PAM) 225, and a link-life estimator module (LLEM) 226. The MPM 221 can predict mobility of the nodes based on the time-based sequence of events. The PAM 225 can determine redundant communication paths in the ad-hoc communications network based on the time-based sequence of events, and identify at-risk communication paths in the ad-hoc communications network based on the time-based sequence of events. The LLEM 226 can estimate the duration of each link based on the time-based sequence of events.

The partition prediction module 222 can receive the time-based sequence of events, predict partitions in the ad-hoc communications network based on the time-based sequence of events, the mobility of the nodes, the duration of each link, the redundant communication paths and the at-risk communication paths. The partition prediction module 222 can generate another portion of the simulation output file which is passed to the output file generator module 230. As used herein, a "partition" comprises a broken communication path which prevents two nodes in the network from communicating with one another.

The partition identification module 223 can receive the time-based sequence of events, determine which nodes belong to a particular sub-network based on the predicted partitions, and generate another portion of the simulation output file which is passed to the output file generator module 230.

The network healing module 228 can generate another portion of the simulation output file which is passed to the output file generator module 230. The network healing module 228 can include, for example, a network state analyzer module (NSAM) 227 and a network adjustment module (NAM) 229. The NSAM 228 can analyze the predicted partitions of the ad-hoc network and network reliability of the ad-hoc network to determine corrections needed to restore the ad-hoc network to a fully communicating ad-hoc network. Based on the corrections, the NAM 229 can repair the ad-hoc communications network and restore it to a fully communicating ad-hoc network by adding external nodes, deleting existing nodes, or moving existing nodes into a different configuration.

The output file generator module 230 can generate a simulation output file based on partitions predicted in the network, information specifying which nodes correspond to a particular partition, information regarding redundant communication paths and at risk communication paths and information about corrections needed to restore the network to a fully communicating network.

The display 234 can receive the simulation output file and can visually display the simulation as a visual animation. The simulation output file drives the display 234.

Figure 4:
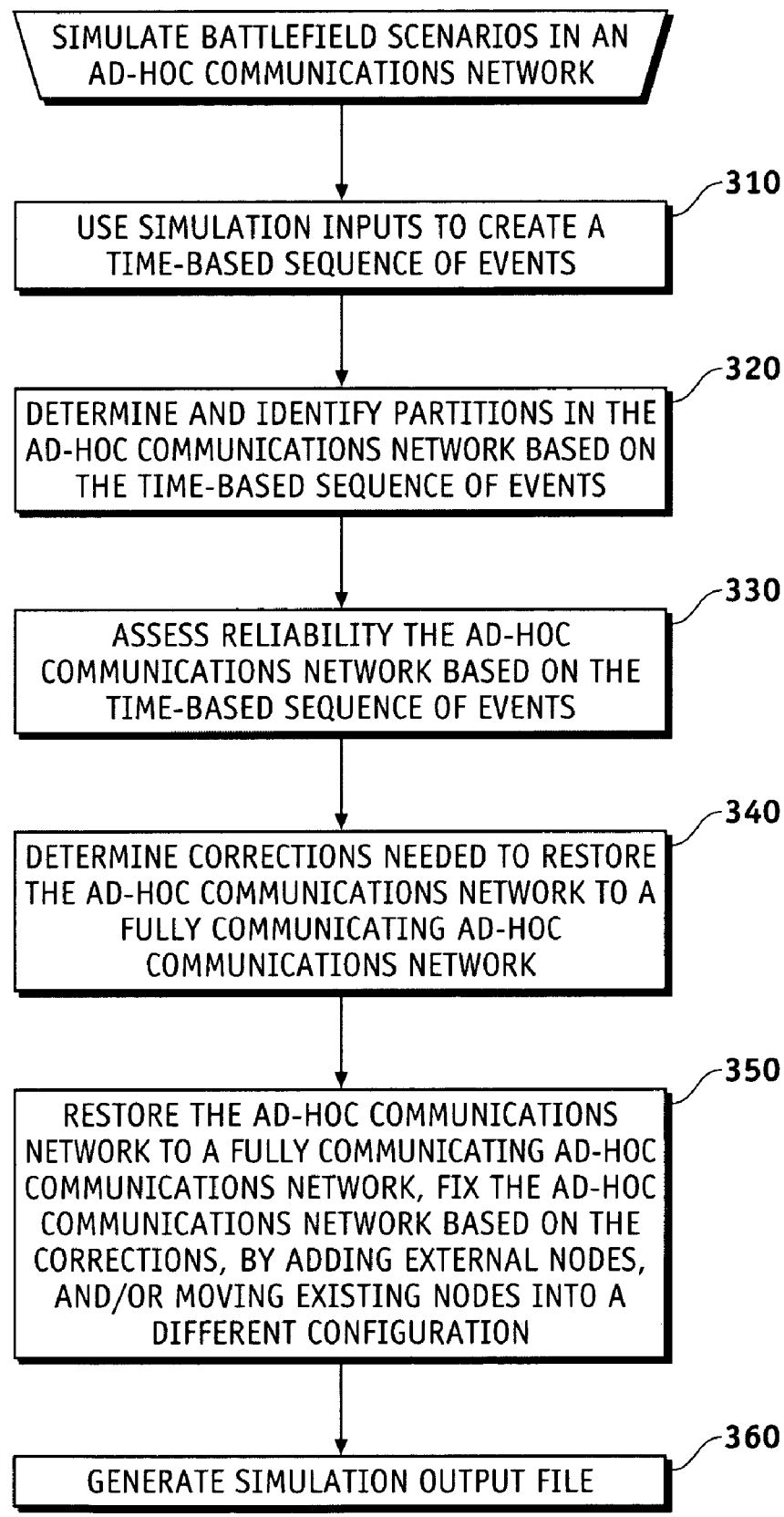
FIG. 4 is a flow chart of a method for simulating battlefield scenarios in an ad-hoc communications network comprising a plurality of nodes and a plurality of links between the nodes.

FIG. 4 is a flow chart of a method for simulating battlefield scenarios in an ad-hoc communications network comprising a plurality of nodes and a plurality of links between the nodes. This method could be implemented, for example, in the systems of FIGS. 1-3.

At step 310, simulation inputs can be used to create a time-based sequence of events. The simulation inputs may comprise, for example, scenario parameters, radio propagation models, a terrain database, and/or mission maps. The time-based sequence of events may comprise, for example, a discrete time sequence of predicted events and random events which change the ad-hoc communications network. The discrete time sequence of predicted events can include, for example, node movements which change the ad-hoc communications network, while random events may comprise at least one of weather changes, terrain changes, or loss of nodes which change the ad-hoc communications network.

At steps 320 through 340, the state of the network is determined and changes to adapt the ad-hoc network can be generated in response to the time-based sequence of events such that each of the nodes maintain a link to at least one of the other nodes so that each of the nodes can communicate with each of the other nodes.

At step 320, partitions in the ad-hoc communications network can be determined based on the time-based sequence of events. A partition comprises a broken communication path between two nodes which prevents at least one of the nodes from communicating other nodes. Partitions in the ad-hoc communications network can be determined by predicting partitions in the ad-hoc communications network based on the time-based sequence of events. This can involve, for example, predicting partitions in the ad-hoc communications network based on the time-based sequence of events, the mobility of the nodes, the duration of each link, the redundant communication paths and the at-risk communication paths. Partitions in the ad-hoc communications network can be identified by determining which nodes correspond to a particular sub-network based on the predicted partitions.

Figure 5:
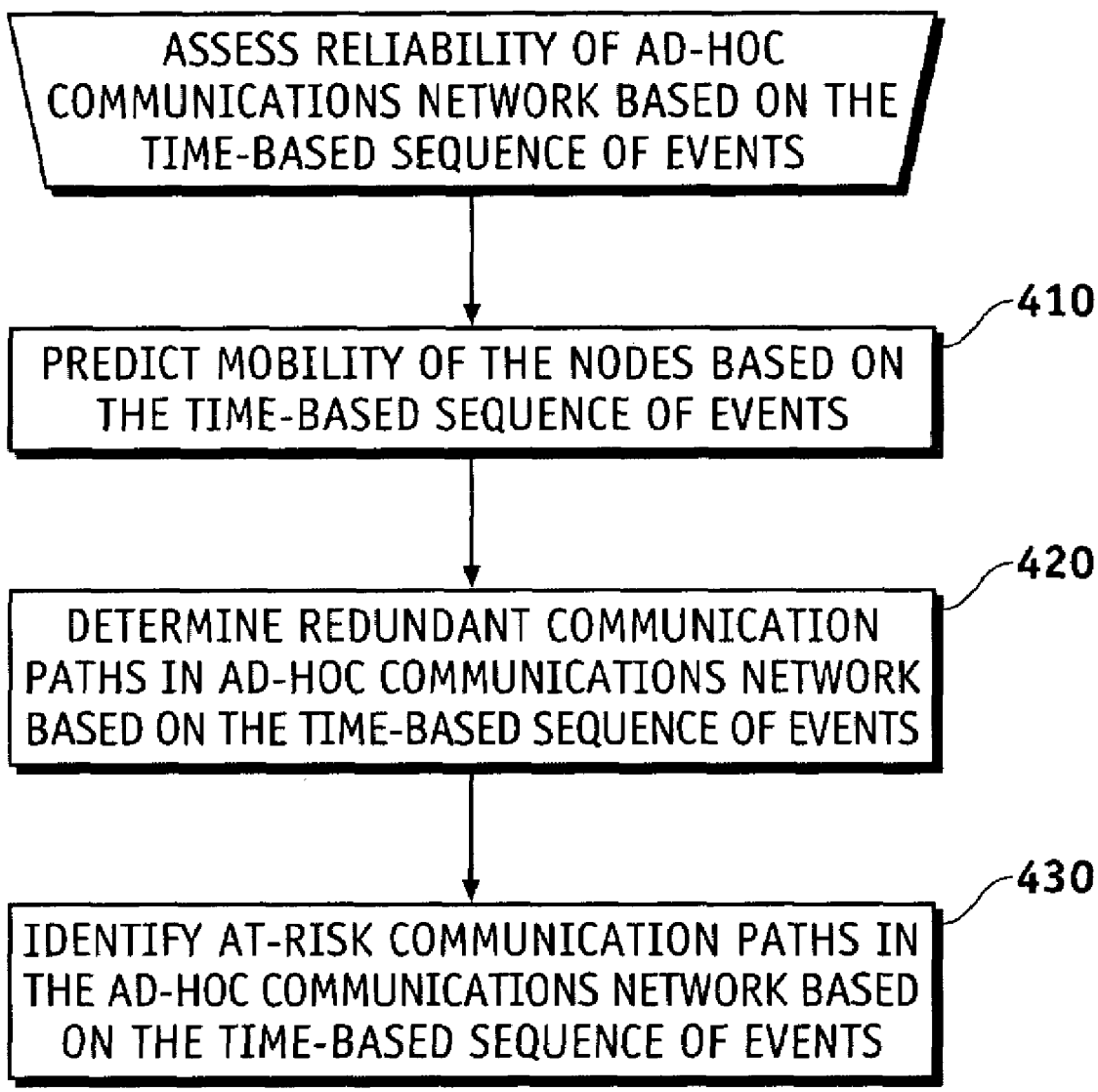
FIG. 5 is a flow chart of a method of assessing reliability of the ad-hoc communications network based on the time-based sequence of events.

At step 330, reliability of the ad-hoc communications network can be assessed based on the time-based sequence of events. FIG. 5 is a flow chart of a method of assessing reliability of the ad-hoc communications network based on the time-based sequence of events. As shown at step 410, mobility of the nodes can be predicted based on the time-based sequence of events. At step 420, redundant communication paths in the ad-hoc communications network can be determined based on the time-based sequence of events. At step 430, at-risk communication paths in the ad-hoc communications network can be identified based on the time-based sequence of events. At step 440, the duration of each link can be estimated based on the time-based sequence of events.

At step 340, corrections needed to restore the ad-hoc communications network to a fully communicating ad-hoc communications network can be determined based on the time-based sequence of events. For example, the predicted partitions of the ad-hoc communications and network reliability of the ad-hoc communications network can be analyzed to determine corrections which can restore the ad-hoc communications network.

At step 350, based on the corrections, the ad-hoc communications network can be fixed by adding external nodes, deleting existing nodes, and/or moving existing nodes into a different configuration to restore the ad-hoc communications network to a fully communicating ad-hoc communications network.

At step 360, a simulation output file can be generated based on partitions predicted in the network, information specifying which nodes correspond to a particular partition, information regarding redundant communication paths and at risk communication paths and information about corrections needed to restore the ad-hoc communications network to a fully communicating ad-hoc communications network.

Thus, numerous embodiments have been disclosed which can provide an intelligent cognitive-based system which assists in the non-real time communication planning phase of a given tactical mission by providing techniques for an off-line event driven simulation during the initial planning phase of a tactical mission. Embodiments of the present invention provide methods and systems for an off-line event-driven simulation for failure management in an ad-hoc communications network. This system can predict and detect link failures, network partitions and separation, and reliability due to propagation environments by taking into account individual link life failure under predicted RF propagation conditions. Once faults have been detected and identified, techniques are provided which can allow for recovery from these failures.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments.

It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein.

In the claims that follow, it should be appreciated that the sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

What is claimed is:

1. A method for simulating battlefield scenarios in an ad-hoc communications network comprising a plurality of nodes and a plurality of links between the nodes, the method comprising:
    generating simulation inputs;
    using the simulation inputs to create a time-based sequence of events;
    predicting mobility of the nodes based on the time-based sequence of events;
    estimating the duration of each link based on the time-based sequence of events;
    determining redundant communication paths in the ad-hoc communications network based on the time-based sequence of events;
    identifying at-risk communication paths in the ad-hoc communications network based on the time-based sequence of events;
    predicting partitions in the ad-hoc communications network based on the time-based sequence of events, the predicted mobility of the nodes, the estimated duration of each link, the redundant communication paths and the at-risk communication paths, wherein a partition comprises a broken communication path between two nodes which prevents the two nodes from communicating with one another;
    determining which nodes correspond to a particular sub-network based on the predicted partitions; and
    analyzing the predicted partitions of the ad-hoc communications network and network reliability of the ad-hoc communications network to determine links needed to repair the ad-hoc communication network to a fully communicating ad-hoc communications network such that each of the nodes maintains a link to at least one of the other nodes which allows each of the nodes to communicate with each of the other nodes.

2. A method according to claim 1, further comprising:
    fixing the ad-hoc communications network by moving nodes into a different configuration, based on the corrections, to restore the ad-hoc communications network to a fully communicating ad-hoc communications network.

3. A method according to claim 1, further comprising:
    fixing the ad-hoc communications network by adding external nodes, based on the corrections, to restore the ad-hoc communications network to a fully communicating ad-hoc communications network.

4. A method according to claim 1, further comprising:
    fixing the ad-hoc communications network by adding external nodes, deleting existing nodes, or moving existing nodes into a different configuration, based on the corrections, to restore the ad-hoc communications network to a fully communicating ad-hoc communications network.

5. A method according to claim 4, wherein the simulation inputs comprise scenario parameters, radio propagation models, a terrain database, and mission maps, and the method further comprising:
    generating a simulation output file based on the predicted partitions predicted in the network, information specifying which nodes correspond to a particular partition, information regarding redundant communication paths and at risk communication paths and information about corrections needed to restore the ad-hoc communications network to a fully communicating ad-hoc communications network.

6. A method according to claim 1, wherein the time-based sequence of events comprises a discrete time sequence of predicted events and random events which change the ad-hoc communications network.

7. A method according to claim 6, wherein the discrete time sequence of predicted events comprise node movements which change the ad-hoc communications network.

8. A method according to claim 7, wherein the random events comprise at least one of weather changes, terrain changes, or loss of nodes which change the ad-hoc communications network.

9. An adaptive neural-based simulator system for simulating battlefield scenarios in an ad-hoc communications network comprising a plurality of nodes and a plurality of links between the nodes, the simulator system comprising:
    a scenario generator configured to use simulation inputs to create a time-based sequence of events; and
    a network adaptation module configured to adapt the ad-hoc communications network in response to the time-based sequence of events such that each of the nodes maintains a link which allows communication with each of the other nodes, wherein the network adaptation module comprises:
    a reliability prediction module configured to receive the time-based sequence of events, assess the reliability of the network, and generate a first portion of a simulation output file, wherein the reliability prediction module comprises:
    a mobility predictor module configured to predict mobility of the nodes based on the time-based sequence of events; and
    a path analysis module configured to determine redundant communication paths in the ad-hoc communications network based on the time-based sequence of events, and identify at-risk communication paths in the ad-hoc communications network based on the time-based sequence of events;
    a link-life estimator module configured to estimate the duration of each link based on the time-based sequence of events;
    a partition prediction module configured to receive the time-based sequence of events, predict partitions in the ad-hoc communications network based on the time-based sequence of events, the predicted mobility of the nodes, the estimated duration of each link, the redundant communication paths and the at-risk communication paths, and generate a second portion of a simulation output file, wherein a partition comprises a broken communication path which prevents two nodes in the network from communicating with one another; and
    a partition identification module configured to receive the time-based sequence of events, determine which nodes correspond to a particular sub-network based on the predicted partitions, and generate a third portion of the simulation output file; and a network healing module configured to generate a fourth portion of the simulation output file, the network healing module comprising:

a network state analyzer module configured to analyze the predicted partitions of the ad-hoc communications and network reliability of the ad-hoc communications network to determine corrections needed to restore the ad-hoc communications network; and a network adjustment module configured to repair the ad-hoc communications network to a fully communicating ad-hoc communications network by adding external nodes, deleting existing nodes, and moving existing nodes into a different configuration, based on the corrections.

10. A system according to claim 9, wherein the simulation inputs comprise scenario parameters, radio propagation models, a terrain database, and mission maps, the system further comprising:

an output file generator configured to generate a simulation output file based on partitions predicted in the network, information specifying which nodes correspond to a particular partition, information regarding redundant communication paths and at risk communication paths and information about corrections needed to restore the network to a fully communicating network.

11. A system according to claim 9, further comprising:

a display configured to receive the simulation output file and configured to visually display the simulation as a visual animation, wherein the simulation output file drives the display.

12. A system according to claim 9, wherein the time-based sequence of events comprises a discrete time sequence of predicted events and random events which change the ad-hoc communications network.

13. A system according to claim 12, wherein the discrete time sequence of predicted events comprise node movements which change the ad-hoc communications network.

14. A system according to claim 12, wherein the random events comprise at least one of weather changes, terrain changes, or loss of nodes which change the ad-hoc communications network.

* * * * *